United States Patent
Sharp

(10) Patent No.: US 12,403,997 B2
(45) Date of Patent: *Sep. 2, 2025

(54) APPARATUS FOR EMISSIONS REDUCTION AS A SERVICE (ERaaS)

(71) Applicant: Robert John Sharp, Camarillo, CA (US)

(72) Inventor: Robert John Sharp, Camarillo, CA (US)

(73) Assignee: STAX Engineering, Inc., Camarillo, CA (US)

( * ) Notice: Subject to any disclaimer, the term of this patent is extended or adjusted under 35 U.S.C. 154(b) by 432 days.

This patent is subject to a terminal disclaimer.

(21) Appl. No.: 17/717,627

(22) Filed: Apr. 11, 2022

(65) Prior Publication Data

US 2022/0266196 A1    Aug. 25, 2022

Related U.S. Application Data

(63) Continuation of application No. 17/468,685, filed on Sep. 8, 2021, now Pat. No. 11,345,455.

(60) Provisional application No. 63/075,632, filed on Sep. 8, 2020.

(51) Int. Cl.
| | |
|---|---|
| B63H 21/32 | (2006.01) |
| B01D 53/92 | (2006.01) |
| B63B 1/04 | (2006.01) |
| B63B 35/00 | (2020.01) |

(52) U.S. Cl.
CPC ............. *B63H 21/32* (2013.01); *B01D 53/92* (2013.01); *B63B 1/04* (2013.01); *B63B 35/00* (2013.01); *B01D 2221/08* (2013.01); *B01D 2258/01* (2013.01)

(58) Field of Classification Search
CPC ............ B63H 21/32; B63B 1/04; B63B 35/00
See application file for complete search history.

(56) References Cited

U.S. PATENT DOCUMENTS

| | | | | |
|---|---|---|---|---|
| 7,306,500 | B1* | 12/2007 | Spangler | B63H 21/34 440/89 R |
| 8,402,746 | B2* | 3/2013 | Powell | B08B 15/00 60/284 |
| 8,915,271 | B2* | 12/2014 | Liu | B67D 9/00 141/382 |
| 9,074,788 | B2* | 7/2015 | Duffy | F24F 13/0263 |
| 9,089,806 | B2* | 7/2015 | Powell | B63H 21/38 |

* cited by examiner

*Primary Examiner* — Anthony D Wiest
(74) *Attorney, Agent, or Firm* — DLA Piper LLP (US)

(57) ABSTRACT

STAXLINK™ is a duct system and method for conveying exhaust gas from an exhaust pipe of an emissions source to a purification unit during an Emissions Reduction as a Service (ERaaS) operation. Example emissions sources include oceangoing vessels and buildings structures. The duct is temporarily installed onto the emissions source without a crane. The duct is supported by the emissions source itself for the duration of the ERaaS operation.

18 Claims, 12 Drawing Sheets

APPARATUS FOR EMISSIONS REDUCTION AS A SERVICE (ERaaS)

CROSS-REFERENCE TO RELATED APPLICATIONS

This application claims the benefit of NPA Ser. No. 17/468,685, filed Sep. 8, 2021, by the present inventor, which is incorporated by reference.

FEDERALLY SPONSORED RESEARCH

None.

SEQUENCE LISTING

None.

BACKGROUND

Emissions sources produce harmful air contaminants such as particulate matter (PM) and oxides of nitrogen ($NO_x$). The United States Environmental Protection Agency (EPA), state and local agencies, and international agencies such as the International Maritime Organization (IMO) continue to tighten maximum emission limits. To meet increasingly stringent regulations, engine and boiler manufacturers and operators install exhaust treatment systems to remove emissions from the exhaust stream before release to the atmosphere. The most significant pollutants are particulate matter (PM), oxides of nitrogen ($NO_x$), oxides of sulfur ($SO_x$), and carbon dioxide ($CO_2$).

Government regulation that limits emissions from ocean-going vessels (OGV's) is becoming more restrictive. For example, the International Maritime Organization (IMO) has implemented regulations that take effect in 2020 that require either 1) the use of reduced-sulfur fuel or 2) scrubber(s) to reduce emissions. Another example is the California Air Resources Board's (CARB) At-Berth Regulation that requires that OGV's either 1) turn off their auxiliary engines while at-berth or 2) use an alternative such as a scrubber system. Other regulators throughout the world are beginning to implement similar rules, regulations, and/or incentives to reduce OGV pollution during transit and/or when at-berth. Regulation of OGV emissions has been increasing for decades and will continue to increase for decades to come.

OGV's typically operate in two modes: 1) underway and 2) at-berth. When the OGV is underway, the main engine is operating to propel the OGV through the water. When the OGV is at-berth, the main engine is shut down. In both modes, however, at least one auxiliary engine operates to provide electrical power for the vessels electrical systems. Each OGV is typically equipped with several auxiliary engines. However, typically only one or two of the auxiliary engines are operated at a time. Emissions from OGV's at-berth are significantly more harmful than emissions from vessels that are travelling on the ocean because the at-berth emissions, especially PM, $NO_x$, and $SO_x$, occur near populated areas.

Most OGV's have a useful life of 40 years or more. Thus, most operating OGV's today have engines and boilers that do not have any emissions control at all. Only a few newer OGV's may have some limited reduction of PM, $NO_x$, and/or $SO_x$. Furthermore, virtually no OGV's have reduced $CO_2$. Some OGV's are equipped for shore power connections while at-berth. Furthermore, the world's ports and vessels are predominantly not equipped for shore power for reduction of at-berth emissions.

Thus, regulation of emissions from OGV's at-berth has been steadily increasing and will continue increase. Regulators are eager to have new methods to reduce pollution from vessels, especially at-berth where the effects of pollution are more harmful than when vessels are underway.

One solution is to retrofit existing the diesel engines or boilers of OGV's with emissions treatment. However, emissions treatment retrofits have the disadvantage of being expensive due to the inefficiency of adding an emissions treatment after the fact as compared to a factory-installed emissions treatment. This is because the OGV must be taken out of service for an extended period and drydocked, and a large amount of engineering and rework that must be done to the OGV to accommodate after-market emissions controls for which the vessel was not designed. Furthermore, most of the available on-board emissions controls are only partially effective and therefore do not meet the requirements of certain ports. Costly and ineffective retrofits discourage installation of emissions treatments, leading to increased PM, $NO_x$, $SO_x$, emissions. Another disadvantage of prior on-board emissions control or retrofitted emissions control is that they are open-loop systems that pollute the oceans with the pollution removed from the exhaust gas. Furthermore, currently available retrofits have the disadvantage of not reducing $CO_2$ emissions.

Fixed emissions sources (e.g., power plants, backup gensets on buildings, and industrial facilities) and mobile emissions sources (e.g., ships, trucks, and automobiles) are ordinarily controlled by emissions control apparatus directly attached to the source, with the emissions control apparatus perpetually connected to the source until the end of its useful life or until the emissions control apparatus is replaced with an updated version.

In response to the above disadvantages of a built-in or retrofit on-board emissions control system, a barge-based approach has been used to 1) connect to a vessel's funnel (stack) using a crane, 2) convey the exhaust gas through a conduit which is supported by the crane to 3) an emissions control system which purifies the exhaust, with the emissions control system located remotely from the OGV 4) on a barge or on the dock.

Emissions Reduction as a Service (ERaaS) device is defined as a single emissions control apparatus that reduces emissions from a plurality of emissions sources (either fixed or mobile sources), typically when and where the emissions are most harmful. For example, emissions from an ocean-going vessel (OGV) are most harmful when the OGV is near populated areas at berth or at anchor, but emissions at sea are relatively less harmful. Another example is emissions from periodic operation of standby gensets, where the emissions only occur when operating. Thus, ERaaS optimizes the single capital expense of the emissions control apparatus by applying it to multiple emissions sources. Otherwise, every emission source would require a costly emissions control apparatus.

The following are definitions of terms used throughout this specification and corresponding terms used in the ERaaS industry.

A "connector" is an interface to an exhaust pipe used to convey exhaust gas to and exhaust duct. A connector is also known as an adapter, exhaust intake bonnet, EIB, bonnet, sock, sock on a stack, intake means, connection port, coupling, ducts, or flexible ducts.

A "crane" (as used heretofore used for ERaaS) is an apparatus sufficiently large to lift, maneuver, and support exhaust ducting from at least one exhaust pipe to a purification unit. The cranes used on barges in heretofore physical embodiments weigh over 50,000 pounds. The term "crane" as used in this application refer to large and heavy apparatus heretofore used in maritime ERaaS and have been known by the following names: arm, placement arm, tower and arm, articulating crane, hydraulic crane, hydraulic arm, telescopic crane, telescopic arm, boom, crawler with telescoping arm, luffing crane, and mobile crane.

"ERaaS" is "Emissions Reduction as a Service". In the maritime industry, this is also known as "capture and control", "sock on a stack", or "bonnet" technology.

A "railing" or "safety rail" or "rail" typically surrounds each exposed deck on a vessel to prevent people from falling off decks, walkways, or stairways.

"Duct" or "ducting" is used in ERaaS is for conveying exhaust gas or flue gas from exhaust pipes of an emissions source to a purification unit. Ducts used in heretofore ERaaS systems have been 12" to 50" diameter metal (e.g., steel duct), flex duct, or a combination of metal and flex duct. ERaaS ducting typically needs to be insulated over part of its length for safety to personnel, safety to assets, energy efficiency, and condensation reasons.

The terms "emissions capture system", "exhaust capture system", and "KS" refer to the combined set of ducting, connector, and crane. Thus, an "emissions capture system" always contains a crane in the heretofore prior art.

An "exhaust pipe" is conduit that conveys exhaust gas or flue gas from a single combustion source or single engine. Some of the prior art incorrectly defines "stack" as an exhaust pipe. However, the term "stack" refers to a ship's funnel, which is a deck at the top of a vessel where a plurality of exhaust pipes penetrates the deck to release exhaust has or flue gas to the atmosphere. The deck of the stack/funnel is typically surrounded by a safety railing, as are the rest of the decks on the vessel.

A "Source", "Emissions source", "source of emissions", "pollution source", "source of pollution", "combustion source", "auxiliary engine", "boiler", "engine", "internal combustion engine", "ICE", "genset", "generator set", "backup genset", "backup generator", "standby generator", "standby genset", "auxiliary generator", "generator", "power station", "power plant", "ship's engine" all refer to a polluting combustion source that is typically sized between 200 kilowatt and 4,000 kilowatt (4 megawatt) each. A source may also comprise a plurality of individual sources. A "large emissions source" is defined as an individual source with an output rating over 200 kilowatts.

A "watercraft" is a ship or boat. A "ship" is a large seagoing vessel or a boat that is propelled by power or sail. A "boat" is a small vessel for travel on water and is different than a ship or vessel. A "barge" is a roomy usually flat-bottomed boat used chiefly for the transport of goods on inland waterways and usually propelled by towing. A barge is especially stable and is suitable for mounting cranes thereon. A "vessel" is a ship that is large and seagoing. A "serviced vessel" is the vessel which produces the exhaust gas to be captured and purified. Ships and boats are hulled vessels, as distinguished from barges that are flat-bottomed. Thus, within this specification, the term "barge" is separate, different, and distinct from a term selected from the group consisting of "vessel", "boat", and "ship".

A "purification unit" is the apparatus that receives exhaust gas or flue gas and removes contaminants including particulate matter (PM), oxides of nitrogen ($NO_x$), oxides of sulfur ($SO_x$), carbon dioxide ($CO_2$), and other pollutants prior to releasing the gas to the atmosphere. A purification unit has also been referred to in the prior art as "emissions treatment system, "ETS", "emissions control unit", "ECU", "advanced maritime emissions control unit", "AM ECU", "STAX-BOX", "advanced emissions control unit", "emissions processing equipment", and "filtering device".

The term "portable" is used herein to mean easily carried, moved, manipulated, or conveyed by hand by a single person, whereas a typical person may be able to safely lift and manipulate objects that weigh 50 pounds.

Emissions Reduction as a Service (ERaaS) for maritime controls (reduces) emissions that would otherwise emanate from a long-lived polluting asset such as an oceangoing vessel (OGV) when the polluting asset it is most harmful. In the case of OGV's, they are most harmful when at-berth. The service provided by ERaaS applies a single emissions control capital expense to many vessels, as opposed installing or retrofitting every vessel with its own emissions control, thereby reducing capital cost. Thus, ERaaS reduces the most harmful at-berth emissions at a much lower cost. Furthermore, a larger initial capital expense for a more efficient ERaaS device is warranted. Furthermore, since only a fraction of vessels contains onboard emissions control, ERaaS allows every visiting vessel the opportunity to reduce emissions, thereby increasing the number of vessels with reduced emissions while at-berth.

ERaaS may also be applied to non-maritime applications, such as backup gensets. Backup gensets in applications such as data centers, hospitals, and others, are required to be tested frequently (once per month, for example). Backup gensets are most hazardous during the periodic testing. Thus, ERaaS may be used to control the emissions when the emissions are most hazardous. In these land-based applications, the ERaaS systems are mostly road transportable, mounted on road transportable chassis, and moved with tractors. However, providing road-transportable connection between the emissions source (e.g., genset) and the treatment system is difficult, because a large crane would typically be needed.

Sometimes, backup gensets are located several floors up, typically on the roof of buildings such as hospitals. It is difficult to reach these gensets with a road-transportable crane. Furthermore, a road-transportable crane, even if it could reach, would likely impede traffic due to the large outriggers that are deployed to stabilize the crane.

The great need for maritime ERaaS systems began in 2005, when the California Air Resources Board (CARB) announced a new regulation to require vessels to reduce pollution when at-berth. Most large oceangoing vessels are not allowed to visit California unless they reduce pollution, either using shore power or ERaaS. If a vessel cannot use shore power because it not fitted for shore power (ships are not fitted with shore power by default) then the vessel cannot provide services in California unless they use ERaaS. The CARB At-Berth Regulation has slowly ramped up since 2010 to ultimately require 80% of all containerships, cruise ships, and refrigerated cargo ships to use shore power or ERaaS when at-berth. In August 2020, CARB expanded the At-Berth Regulation to also begin regulating additional vessel types such as auto carriers, roll-on/roll-off vessels, and tankers. These additional vessel types must comply with the new expanded regulation beginning in 2025. The newly regulated vessel types (auto carriers, RoRo's, and tankers) are not well-suited for shore power; thus, these additional vessel types will need ERaaS. Other states/ports in the United States and other countries are also beginning to adopt similar emissions reduction methods.

Vessels can use maritime ERaaS from the land side or the water side. Some vessel types, such as containerships, highly-favor a water-side approach due to port operations on the land side (on the wharf or dock). Since containerships were among the first to be regulated by CARB, the water-side approach was initially adopted, and two barge-based ERaaS systems were put into operation.

Three maritime ERaaS systems that have been built to date. Two of the existing ERaaS systems are barge and crane systems and are actively used in the Los Angeles vicinity. The third system is a demonstration unit that is a mobile land-based system with a crane for smaller vessels such as bulk carriers. The two barge-based systems have been in operation since 2015. However, disadvantages of the crane approach (discussed below) have prevented widespread use of ERaaS to serve vessels that must comply with the California At-Berth regulation. Due to these disadvantages, most containerships have instead installed shore power equipment at a cost of about $1 million per vessel. The overall total estimated cost in California alone to all the California fleets and ports is $2 billion. At least half of this cost could have been avoided by using ERaaS instead, but the disadvantages of a barge and crane approach prevented the widespread adoption of maritime ERaaS.

ERaaS promises to save fleets and ports from the need to install expensive shore power equipment. However, the significant adoption of maritime ERaaS depends on eliminating some of the disadvantages of heretofore embodiments. Thus, there has been a long-felt need to provide workable ERaaS alternatives to shore power since 2005, but heretofore efforts have failed to meet the demand because the solution is not obvious.

The CARB At-Berth Regulation, as mentioned, will be expanding to additional vessel types, which will otherwise require similar investments in vessel and port shore infrastructure if an improved ERaaS solution is not adopted. Furthermore, regulations like the CARB At-Berth regulation are expected to spread to the rest of the United States and to other countries. This application solves the disadvantages of the prior art's crane based ERaaS approach and can save fleets and ports billions of dollars while also reducing more pollution.

The crane-based version of ERaaS has proven beneficial, but with difficulties. Crane-based vessel emissions control has been used as of this application, with only two barge and crane emissions control systems operating during this period. The barge and crane systems have been partially effective, however numerous disadvantages have prevented widespread adoption, despite the tremendous potential benefit. The vessel emissions control industry has not been able to solve the following disadvantages despite the urgent need and despite the efforts of persons having skill in the art focusing on the disadvantages.

Heretofore known ERaaS systems for larger vessels such as containerships used a crane with a reach of approximately 120 feet vertically and 120 feet horizontally. If a crane were allowed reach vessel exhaust pipes directly along a diagonal path, the crane would require a reach of about 200 feet. However, since vessels have high side walls and are mostly square in cross section, the crane must first follow a vertical path followed by a horizontal path to clear the vessel structure to reach the vessel's exhaust pipes. Thus, the required overall combined reach of the crane is about 240 feet.

Heretofore physical prior art and embodiments of ERaaS systems all use ducting and all required large and heavy cranes or arms to support the ducting. These large cranes or arms transmit a significant tipping moment to the deployment platform. Thus, the deployment platform must be substantial enough to resist the tipping moment, which is especially important in the case of a water-based application. Hulled vessels, as opposed to barges, cannot be used because they would tip over. Thus, barges (not hulled vessels) have been used in both existing waterside ERaaS applications because barge deployment platforms provide the most resistance to rolling motion caused by off-center reach of the cranes over the vessel.

Heretofore prior art embodiments used then-available non-portable duct that was relatively heavy, requiring a likewise heavy-duty crane or arm to partially support the duct along the path from the exhaust pipe to the purification unit. In other words, the heavy duct required a large and heavy crane or arm.

For maritime ERaaS, a minimum practical length of a duct segment that is installed manually, without the use of a crane, if a plurality of duct is connected in series to form a longer duct, is defined as the minimum deck-to-deck height on an oceangoing vessel, which conservatively ten feet. This is the height where each end of each duct segment may be accessed from each deck of the vessel. The maximum weight of a portable (manually positionable) duct segment is defined as fifty pounds, which is generally accepted (e.g., OSHA) as the maximum weight that a person can manipulate without help from another person or from a supporting mechanism. Thus, for the example ten-foot duct segment defined above, a portable, manually positioned duct segment can be no more than 50 pounds divided by ten feet, or five (5) pounds per foot. Longer duct segments than the minimum ten feet would have to weigh less than five pounds per foot to remain manually manipulated by a person. Five pounds per foot is considered a conservative estimate, and less than five pounds per foot would be preferred by all workplace safety organizations (e.g., OSHA). Thus, the maximum weight per foot of portable, manually-manipulatable, ducting is defined in this application as five pounds per foot. Although multiple people could manipulate ducts with heavier specific weight (weight per foot), at some point, a single person would have to support the entire weight during normal operations. Thus, manually manipulated (portable) ducting must be less than 50 pounds total per duct section. Ducting with a higher specific weight must be supported by an arm or a crane.

Ducting used to convey exhaust gas from exhaust pipes of oceangoing vessels are typically about 28 to 36 inches in diameter. The weight of the smaller 28-inch ducting depends on the material of construction. For example, a typical 18 gauge (0.050" thick) stainless steel duct weighs approximately 17 pounds per foot. Adding two inches of insulation adds at least one pound per foot. Adding 0.016" thick protective cladding over the insulation adds at least four pounds per foot. Thus, a typical stainless steel 28" diameter duct weighs at least 20 pounds per foot. Thus, a disadvantage of metal duct, and especially insulated metal duct is not portable, and must be (at least partially) supported by a substantial crane or arm, even if the ducting is segmented into individual ducts in a series and installed on a deck-by-deck basis.

An alternative to a metal duct is "flex duct", which heretofore has been the lightest commercially available type of duct. Flex duct is typically composed of fabric, comprising strips of heat-resistant fabric clamped within a metal helical coil. Flex duct of the required diameter is still greater than the maximum portable weight of five pounds per foot (uninsulated) thereby sharing the same weight disadvantage as metal duct when used for conveying exhaust gases a significant distance.

A further disadvantage of flex duct is specific strength, or the ability to support its own weight in a hanging orientation. Flex duct is constructed by clamping fabric strips together. It is relatively easy to tear the fabric strips out of the helical crimp. Flex duct in the range of 28" to 36" exceeding about 20 feet cannot support itself vertically with risking duct failure near the top of the duct. Furthermore, any additional weight from duct unions or other attachments only makes the problem worse. Thus, ducting lengths more than 10 feet must be supported by in some way, such as with a crane or an arm.

A further disadvantage of flex duct when hung vertically, is that the duct will tend to drop to the bottom and stretch the duct at the top. Thus, most of the helix will pile to the bottom of the length of duct, and the helix at the top of the duct will be stretched to capacity. Thus, the top section of the duct will be strained, which increases the likelihood of failure. Furthermore, the ducting at the bottom will be compressed, which causes the fabric to fold in towards the center, which reduces the effective diameter of the ducting in this location, which causes a local pressure drop resembling an orifice. Thus, lengths of flex duct exceeding about four feet will likely because unwanted pressure drop when oriented vertically.

A non-collapsible version of flex duct has been available in the prior art which does not have some of the disadvantages of the collapsible fabric flex duct. This type of flex duct comprises a metal coil that is coated surrounded with silicone-coated high-temperature cloth. However, heretofore ducting of this style has had the disadvantage of being limited to a maximum of 12 inches in diameter and further disadvantage of being limited to an operating temperature of 500 degrees Fahrenheit when not insulated and an even lower temperature limit if insulated. Yet another limitation of this type of duct is that its flexibility is limited, and if this type of flexible duct is caused to bend sufficiently, it will fold, causing a nearly complete obstruction to gas flow.

A further disadvantage of flex duct is that it is difficult to insulate, because insulation is not flexible. For this reason, heretofore embodiments did not insulate the flex duct aspects. If an exhaust gas travels from a top of a vessel to the water line, the exhaust gas will cool to less than approximately 250 degrees Fahrenheit, which will introduce condensation of acidic gases within the duct, which causes corrosion downstream within the purification apparatus. A further disadvantage of a cooled exhaust gas resulting from an uninsulated duct is that the gas must be ultimately re-heated to at least 600 degrees Fahrenheit, which significantly decreases energy efficiency and increases operating costs. Furthermore, at the source, exhaust gas temperatures can exceed 1,000 degrees Fahrenheit. Thus, a further disadvantage of an uninsulated duct is the safety hazard of contact with the hot duct to personnel or to assets, such as painted surfaces, which could be damaged by the high temperature.

A further disadvantage of flex duct is pressure drop. Flex duct comprises a fabric between a metal helix that can collapse to about ⅛$^{th}$ its length to make it easy to transport. However, the combination of fabric and helical structure forms a non-smooth wall that resembles a repeating triangular pattern that can cause a significant resistance to flow near the walls of the duct, causing a significant pressure drop per foot compared to a smooth duct. Thus, the pressure drop per foot in a flex duct can be multiples higher compared to a corresponding smooth duct, which causes the system blower to work harder, increasing the cost of operation. Thus, for this reason alone, the amount of flex duct in the emissions control inlet ducting system should typically be limited to less than approximately 10% to 15%.

A further disadvantage of flex duct is the ability to withstand vacuum within the duct. It is preferred to maintain a vacuum throughout the ducting system to prevent the escape of exhaust gas. Escaping gas is known in the art as fugitive emissions. If a vacuum is not maintained within the ducting, regulators would require a way to prove that fugitive emissions were not escaping, which is practically impossible. Unfortunately, flex duct in the range of 28" to 36" only has a vacuum rating of about 1 inch of water. A typical vacuum within an emissions control system can reach over 10 inches of water. Thus, flex duct mostly unsuitable for this purpose, especially downstream where the vacuum is higher.

A further disadvantage of flex duct under vacuum is that it will tend to contract along its length. Contraction can cause undesired or unanticipated movement, which can be dangerous. This is particularly an issue for long-lengths of flex duct. Another disadvantage of flex duct is when the inlet to the duct is obstructed, causing a high vacuum throughout the length the duct, which can cause both powerful unanticipated movements, followed by a catastrophic collapse of the ducting beginning at the obstruction with continued collapse travelling downstream. This can be extremely dangerous and block the gas flow and prevent further operation until repaired.

A further disadvantage of flex duct is that is vulnerable to damage from a crushing force. Thus, flex duct is not durable and should be minimized.

A further disadvantage of flex duct is the fabric can be easily punctured, thereby allowing outside air to enter, which reduces system efficiency due to processing additional gas at minimum, and limits capacity at maximum. Thus, flex duct is vulnerable to damage and should be minimized.

Flex duct may be used for part of the ducting from the exhaust pipe to the treatment system. However, the length of the flex duct must be minimized and constrained to be less than a total of 40 feet to prevent unacceptable loss of heat. For a 250-foot length of duct between the exhaust pipe and the treatment system, for example, no more than about 15% of the duct should be uninsulated.

A flexible duct system that is pressurized by an emissions source has been contemplated by the inventor. However, the disadvantage of a pressurized duct is that fugitive emissions from the duct are likely, and the ducting can become kinked which could a choking point and cause catastrophic failure. A further disadvantage of a pressurized flexible duct approach is that emissions are likely at the connection point to the exhaust pipe causing further fugitive emissions. Yet another disadvantage of a pressurized flexible duct approach is that insulation is difficult, and insulation will render the duct "non-portable". A further disadvantage of a pressurized flexible duct approach is that a back pressure would be applied to the source. Backpressure on a source is unacceptable, especially for boilers, where backpressure can adversely affect the operation of the source.

Thus, flex duct may be useful for a 10% to 15% fraction of the ducting between the source and the purification unit, but not for a major fraction. Thus, heretofore prior art has relied on metal duct for most of the duct length between the source and the purification unit. Unfortunately, the weight of heretofore prior art embodiments has required a heavy-duty crane or arm to support the composite metal duct and flex duct assemblies. A disadvantage of a crane or arm is a significant cost, with crane or arm systems typically exceeding $750,000. A further disadvantage of a crane or arm is significant weight, typically exceeding eight tons. A further disadvantage of a heavy-duty crane or arm is that it has required a barge-based approach in water-based applications to support the crane/duct apparatus. Persons skilled in the art have heretofore been unable to contemplate a solution to this problem over many years. Thus, heretofore ERaaS embodiments have required a crane or arm to support the heavy ducting. Furthermore, heretofore embodiments for waterside (water-based) maritime ERaaS applications have all comprised a barge to support the crane or arm. Thus, there has been a consistent need to eliminate the crane or arm from ERaaS systems.

As discussed previously, the requirement for a crane has resulted in the need to use a floating platform (barge) to support the crane. A barge with an approximate beam of at least forty feet has been found necessary to provide the necessary stability for the required crane. Barges were selected, as opposed to hulled vessels, because a hulled vessel with the same stability would be considerably more expensive. However, the use of barges in the water-side approach to maritime ERaaS has significant disadvantages that have prevented the widespread adoption of the much needed maritime ERaaS.

Heretofore barge-based approaches typically used a version of the following method: 1) the emissions control barge is positioned next to the serviced vessel with at least one tugboat, 2) the emissions control barge is moored (tied to) the serviced vessel with lines, 3) the positioning arm and associated ducting is articulated so that the tip is over the top of the serviced vessel's funnel (also called a stack), 4) at least two service people board the serviced vessel and make their way to the top of the serviced vessel's funnel near the exhaust pipes, 5) the service people grasp then end of the ducting that is extends beyond the positioning arm and places the end of the ducting over a working exhaust pipe, 6) exhaust gas is then directed through the ducting, down the arm through a distance of approximately 250 feet, and through the purification unit on the barge thereby purifying the exhaust gas, the service people depart from the serviced vessel, 7) at least two service people stay on the barge for the duration of the service which can typically last between six hours to six days, 8) when the serviced vessel is ready to depart then the opposite procedure is followed in reverse order.

A first disadvantage of a barge-based approach is that a barge must be positioned alongside the serviced vessel which requires a tugboat. Tugboats add considerable expense and complication. Furthermore, tugboat demand predominantly peaks on a weekly repeating basis, for their primary purpose of guiding vessels in and out of harbor, which reduces tugboat availability at the very time it is needed when a vessel arrives at port or when a vessel departs from port. Thus, another disadvantage of requiring a tugboat service is that tugboats are frequently not available for positioning the barge since the tugboats are in high demand for supporting vessel movements.

Yet another disadvantage of a barge-based approach is that a crew of at least two is required during the barge's operation. A crew is expensive.

Yet another disadvantage of a barge-based approach is that a barge can be located under cargo operations. Cargo has been known to frequently fall from the serviced vessel. Falling cargo can fall on a barge that is alongside and cause damage, injury, and death.

Yet another disadvantage of a barge-based approach is that the barge can obstruct other services such as bunkering. Bunkering is when a fuel barge comes alongside a vessel while it is at berth when a serviced vessel needs to be refueled. Unfortunately, the bunker barge needs to be positioned in the same general location as a barge-based emissions control system. This location is near the superstructure, which is near the engines and fueling hose connections and near the vessel's stack. Thus, an emissions control barge will frequently need to be moved out of the way to make room for a bunker barge. During the bunkering, the emissions control function may have to be suspended. Thus, the barge-based approach has the disadvantage of requiring temporary relocation during bunkering operations which interrupts its emissions control service.

The barge-based approach has yet another disadvantage of obstructing other vessel traffic when alongside a serviced vessel. This is especially a problem in narrow channels.

Any water-based ERaaS approach that uses a crane has the disadvantage of relative motion caused by instability of the floating platform when exposed to ocean waves and water movement from other vessels passing nearby. The floating platform instability can result in excessive relative movement between the exhaust capture system and the vessel which can lead to dangerous contact or damage to the vessel or the ERaaS exhaust interface. The relative motion can also cause the ducting to be disconnected from the exhaust pipe.

ERaaS operations for vessels at-anchorage resemble ERaaS operations for vessels at-berth where the main engine are off and one or two auxiliary engines remain working, just as when at-berth. Although vessels at anchorage produce similar emissions, vessels at anchorage are more difficult to service than vessels at anchorage. Vessels at-anchorage will typically experience much more motion, especially rolling, compared to vessels at-berth. The relative motion between the serviced vessel and a servicing emissions control barge is more than can be accommodated by current emissions control barges. Thus, the barge-based approach has the disadvantage of not being able to service vessels at anchorage.

Fixed land-based approaches, another form of ERaaS, have been proposed to avoid the disadvantages of a barge-based approach. However, for vessels such as containerships, a land-based platform has the disadvantage of not being practical because land-based dock operations prohibit obstructions near the vessel when container cranes are loading and unloading of cargo. Thus, barge-based approaches have been preferred to land-based approaches, especially for containerships.

Another disadvantage of a fixed land-based approach is that a fixed land-based system can only serve the berth in which it is located. Thus, if a vessel berths at an adjacent terminal, the land-based emissions control is unused and under-utilized. This underutilization increases the lifecycle cost of the device and would require many more land-based units (e.g., one at every berth) in order to achieve the same effectiveness of a barge-based approach.

Yet another disadvantage of a fixed land-based approach is construction of a permanent system on a terminal requires considerable planning and permitting, which can delay the implementation by years and increase the cost of the system.

Fixed land-based approaches also share some of the same disadvantages of barge-based approaches such as a large placement arm that need to reach all the way from the wharf to the top of the stack and interference with other vehicles, especially the space on the wharf is limited.

Thus, there has been a long-felt need for an improved ERaaS apparatus or method to reduce global emissions such as PM, $NO_x$, $SO_x$, and/or $CO_2$ from vessels at-berth that does not require a crane or a barge with a crane. Heretofore crane-based embodiments of maritime ERaaS have proven somewhat beneficial, but their disadvantages have prevented widespread adoption. The vessel emissions control industry has not been able to solve the aforementioned disadvantages despite the urgent need and despite the efforts of many persons having skill in the art who have been experiencing these disadvantages. Thus, overcoming the disadvantages of heretofore barge based ERaaS embodiments have not been obvious.

SUMMARY

In accordance with at least one embodiment, an apparatus and method for a Ship Technology for Air Excellence (STAX) for capturing and purifying emissions from vessels using Emissions Reduction as a Service (ERaaS) that eliminates the need for a heavy-duty crane, or a barge with a crane, for supporting the ERaaS ducting.

DRAWINGS—FIGURES

The novel features which are characteristic of the present invention are set forth in the appended claims. However, embodiments, together with further objects and attendant advantages, will be best understood by reference to the following detailed description taken in connection with the accompanying drawings in which:

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

The details of one or more embodiments of the invention are set forth in the accompanying drawings and the description below. Other features, objects, and advantages of the invention will be apparent from the description and drawings, and from the claims.

Figure 1:
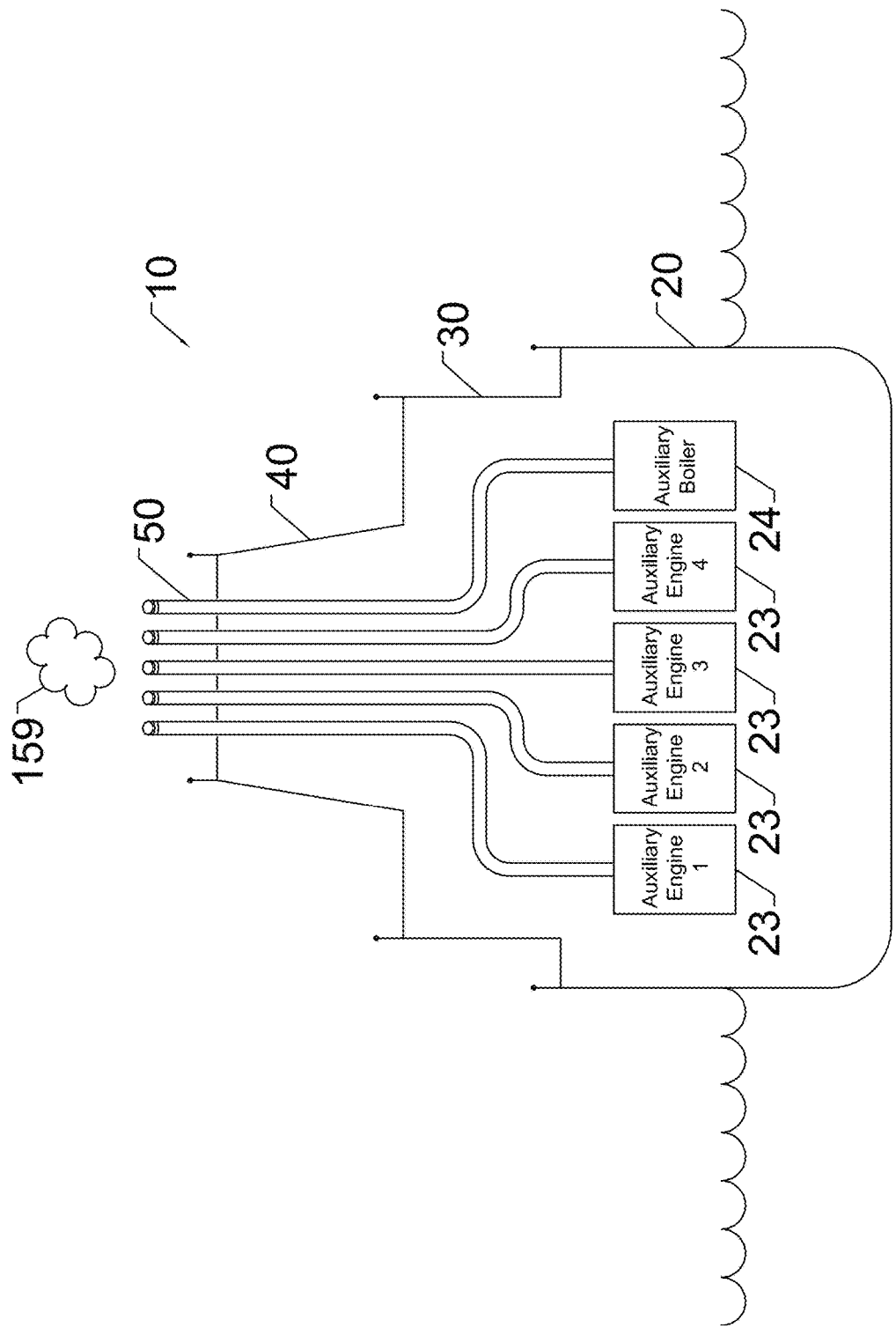
FIG. 1 shows an exemplary cross section of an oceangoing vessel (OGV) with four auxiliary engines and an auxiliary boiler and their associated exhaust pipes.

FIG. 1 shows an exemplary cross section of an oceangoing vessel (OGV) 10 comprising a hull 20, a superstructure 30, a funnel/stack 40, four auxiliary engines 23, and auxiliary boiler 24. Auxiliary engines 23 supply the vessel's electrical power. Typically, only one or two auxiliary engines 23 are operating. The main engine, used for propulsion, is not shown because the main engine is not operating when the OGV is at berth or at anchorage. Each auxiliary engine 23 or auxiliary boiler 24 connect to an exhaust pipe 50. Each exhaust pipe 50 exits the top of the OGV's funnel/stack 40. Exhaust gas 159 from any engines and boilers emanate from exhaust pipes 50 to the atmosphere.

Figure 2:
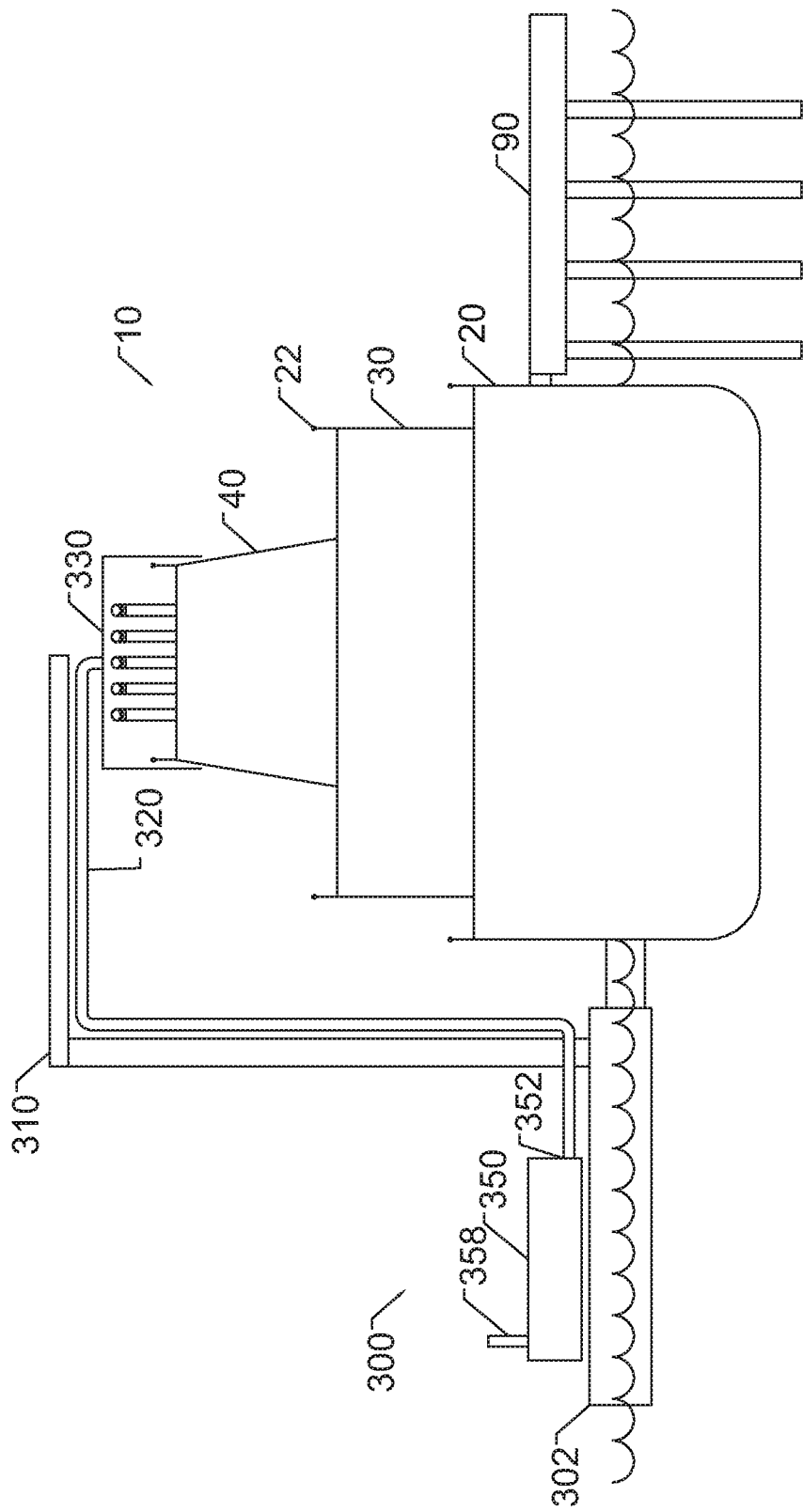
FIG. 2 shows a prior art barge-based ERaaS operating on an oceangoing vessel (OGV) at-berth connected to the OGV's stack with a crane that supports the ducting along the path from the exhaust pipes to a purification unit on a barge.

FIG. 2 shows an exemplary prior art embodiment of a barge based ERaaS system 300 connected to an oceangoing vessel (OGV) 10, comprising hull 20, superstructure 30, guard rails 22, stack/funnel 40. A barge-based emissions control system 300 comprising barge 302, capture crane/arm 310, ducting 320 supported by capture crane/arm 310, bonnet/connector/adaptor 330, and emissions control unit 350. Barge-based emissions control system 300 is shown perpendicular or alongside OGV 10 and is connected to the OGV 10 funnel/stack 40 with bonnet 330. Bonnet 330 connects to ducting 320 which connects to emissions control unit 350 via inlet 352. As gas is processed through emissions control unit 350, the purified gas exits exhaust pipe 358. Exhaust capture crane/arm 310 is for positioning and placement of bonnet 330 and supports bonnet 330 and ducting 320. Bonnet 330 is shown contracted around funnel/stack 40 and thereby covers all exhaust pipes within stack/funnel 40. Wharf 90 is shown, indicating that OGV 10 is at-berth.

Figure 3:
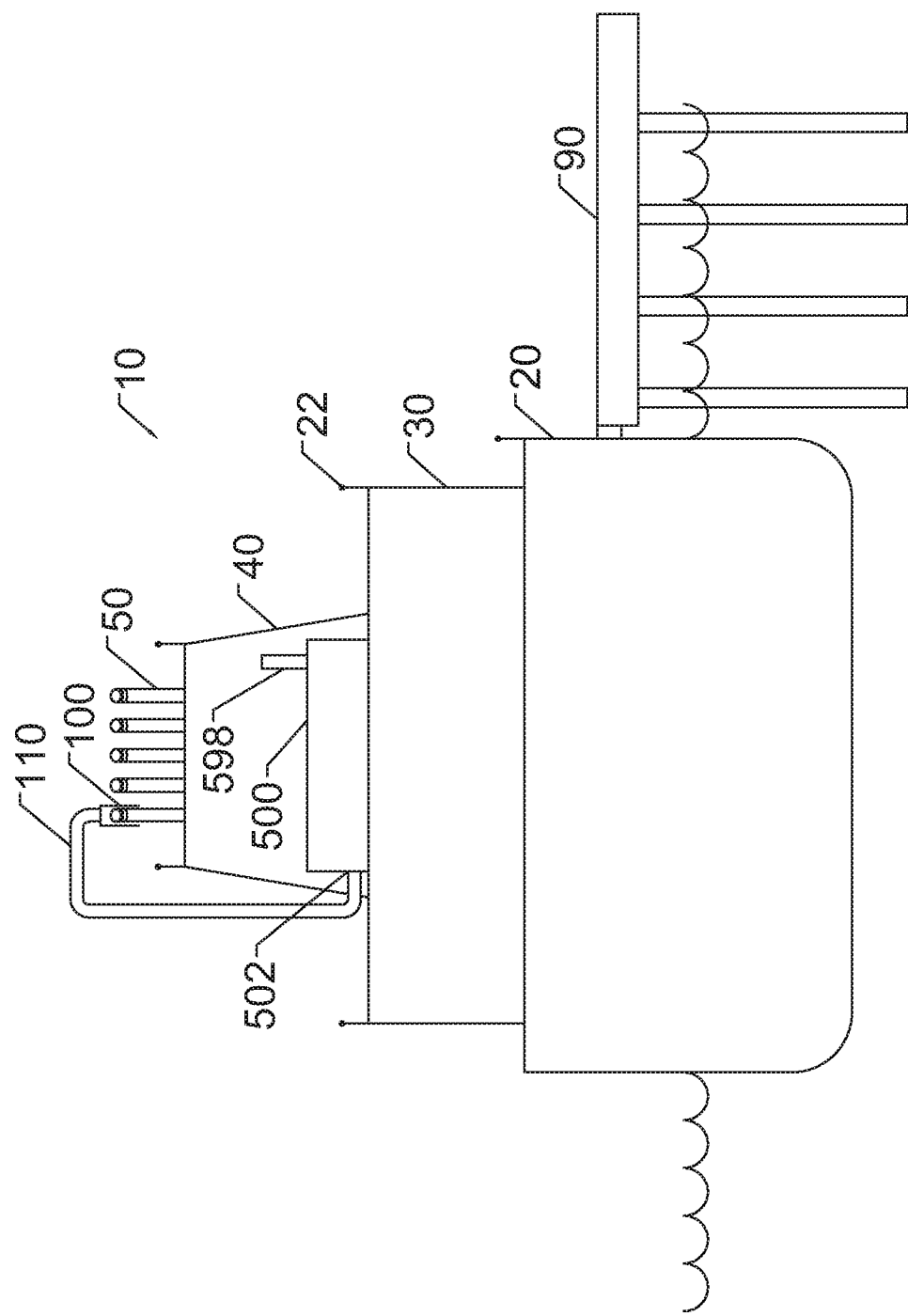
FIG. 3 shows a rear view of an exemplary embodiment in which exhaust gas from an OGV is captured and transmitted to a purification placed on an upper deck on the OGV.

FIG. 3 shows a rear view of an exemplary embodiment of the present invention wherein purification unit 500 is placed on an upper deck of OGV 10 and is connected to exhaust pipe 50 via exhaust pipe connector hood 100, ducting 110, and purification unit inlet 502. OGV 10 comprises hull 20, superstructure 30, guard railing 22, a stack/funnel 40. OGV 10 is shown at-berth adjacent to wharf 90. The placement of purification unit 500 on the deck may be temporary, in which case the purification unit may be placed by a crane or other lifting device and may be permanent or semi-permanent.

Placement of the purification unit on an upper deck of the OGV may allow a much shorter and/or simpler ducting 110.

Figure 4:
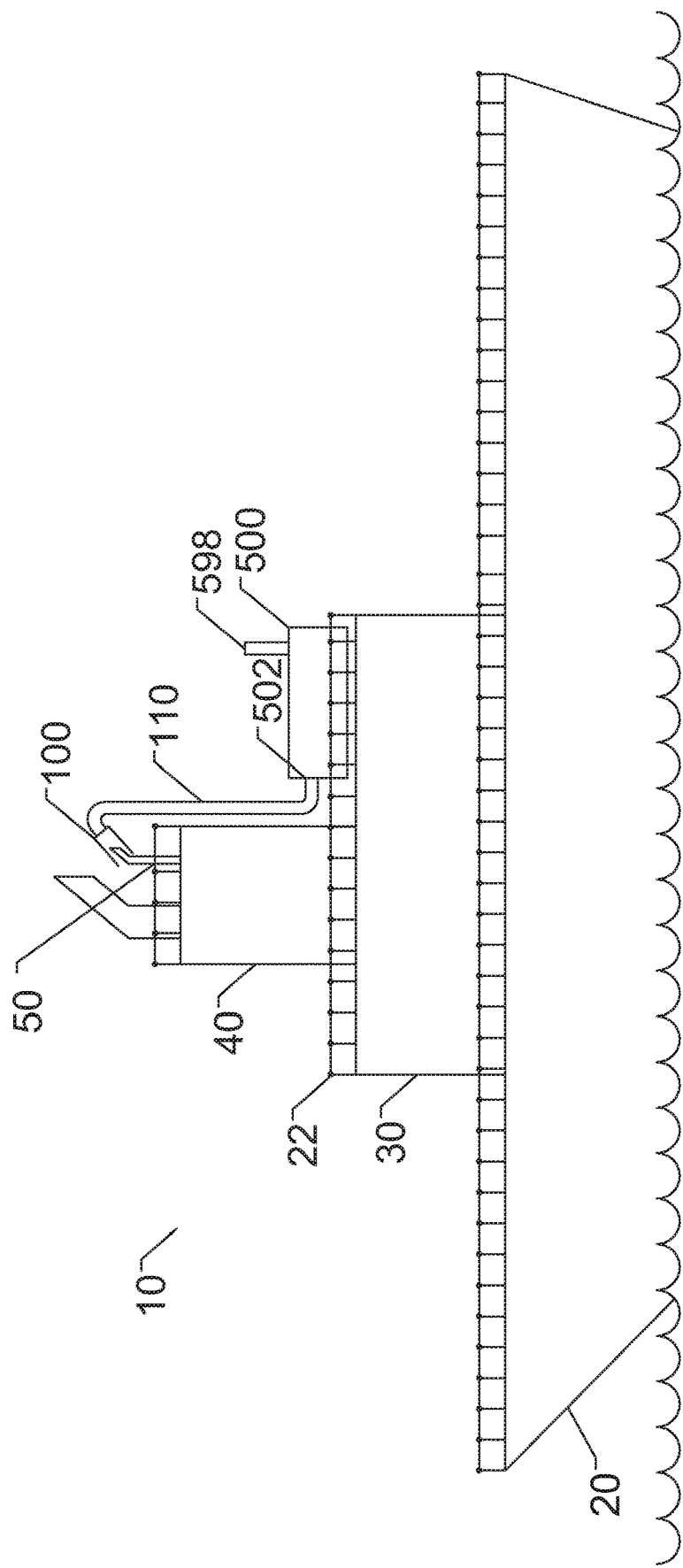
FIG. 4 shows a side view of an exemplary embodiment wherein the OGV exhaust gas is captured and transmitted to a purification temporarily placed on an upper deck on the OGV.

FIG. 4 shows a side view of an exemplary embodiment of the present invention wherein purification unit 500 is placed on an upper deck of OGV 10 and is connected to exhaust pipe 50 via exhaust pipe connector hood 100, ducting 110, and purification unit inlet 502. OGV 10 comprises hull 20, superstructure 30, guard railing 22, a stack/funnel 40. The placement on the deck may be temporary, in which case the purification unit may be placed by a crane or other lift device, or permanent or semi-permanent.

Figure 5:
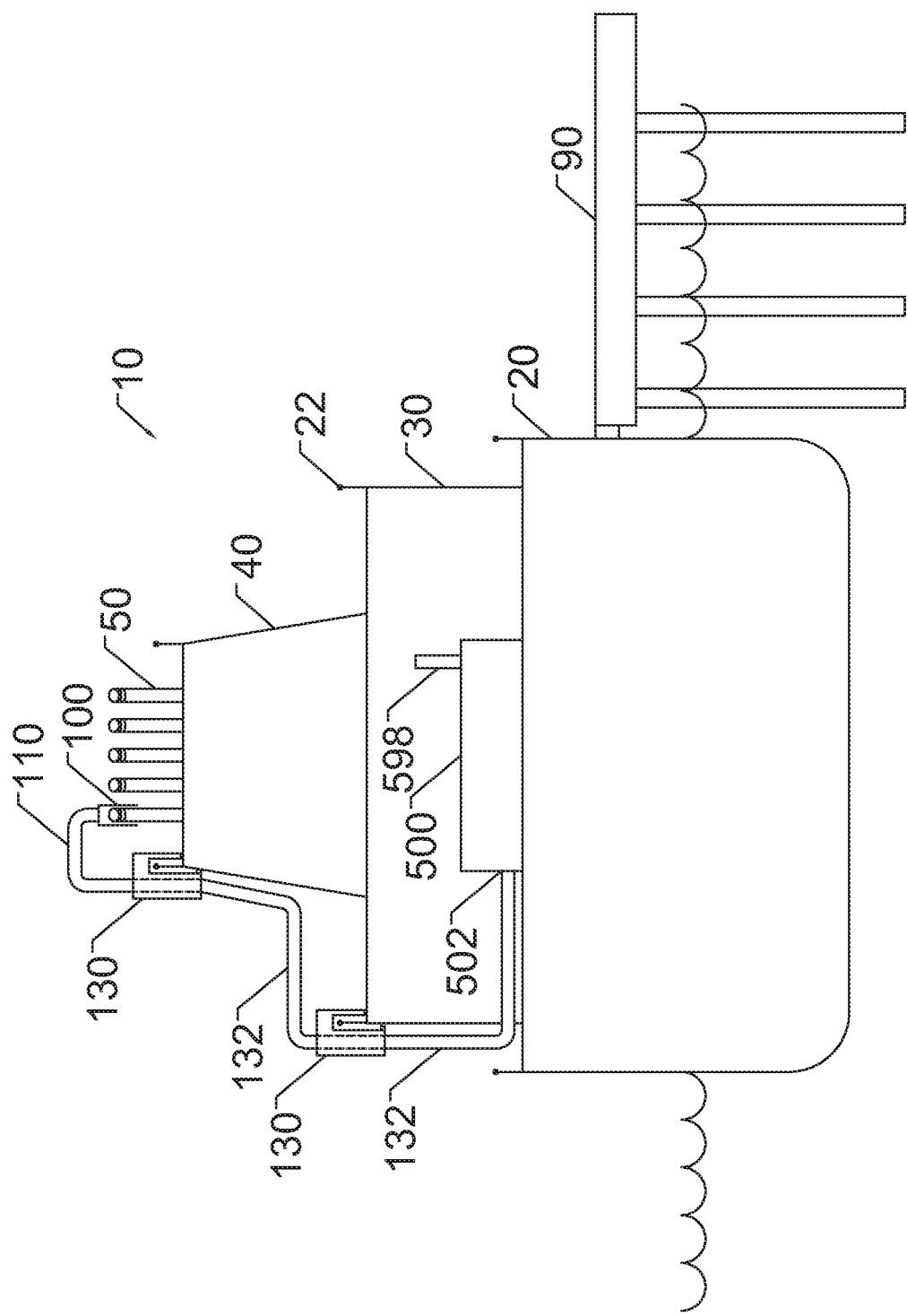
FIG. 5 shows a rear view of an exemplary embodiment wherein the OGV exhaust gas is captured and transmitted to a purification placed on a lower deck on the OGV.

FIG. 5 shows a rear view of an exemplary embodiment wherein purification unit 500 is placed on a lower deck of OGV 10 and is connected to exhaust pipe 50 via connector hood 100, ducting 110, two sets of duct hanger 130 and duct hanger outlet duct 132, and purification unit inlet 502. OGV 10 comprises hull 20, superstructure 30, guard railing 22, a stack/funnel 40. OGV 10 is shown at-berth adjacent to wharf 90. The placement on the lower deck may be temporary, in which case the purification unit may be placed by a crane or other lifting device, or permanent or semi-permanent.

Figure 6:
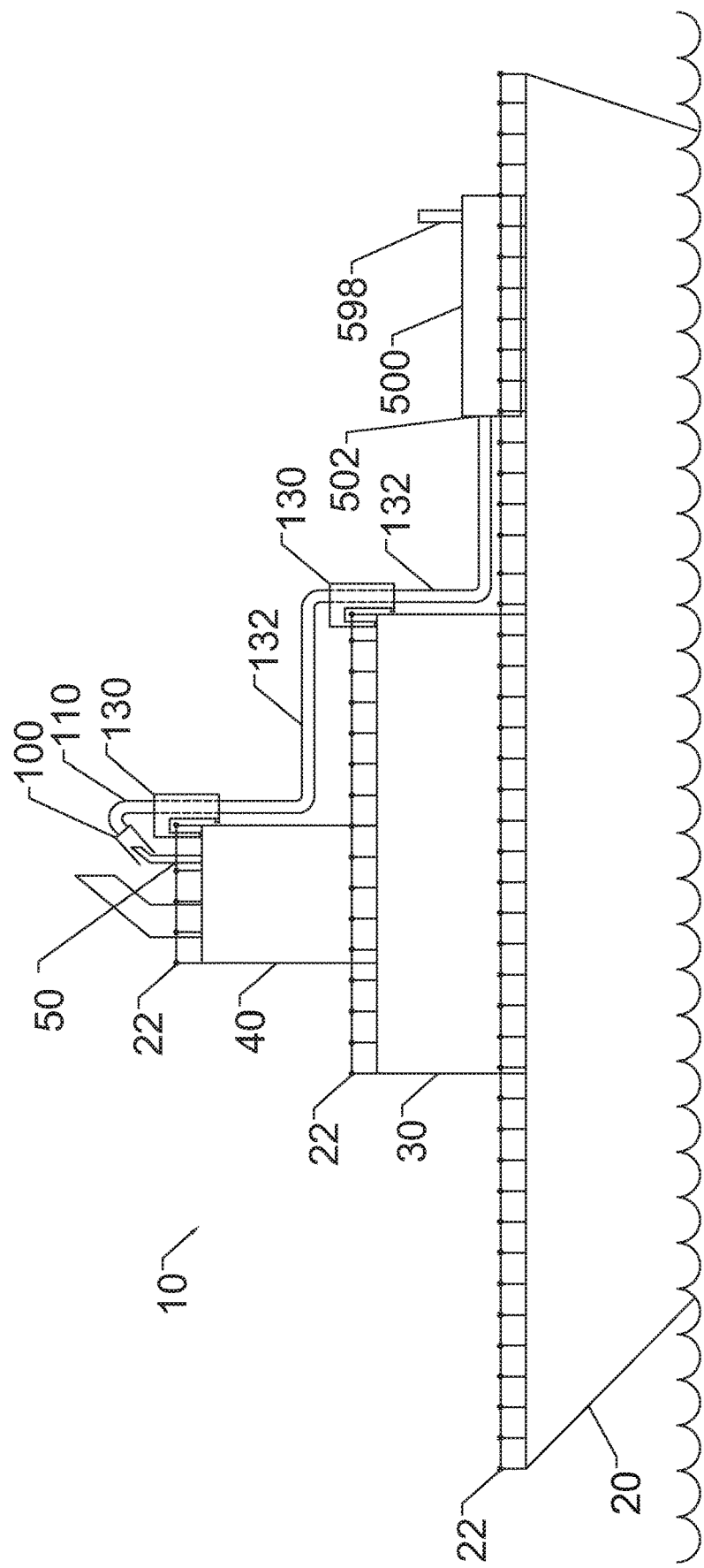
FIG. 6 shows a side view of an exemplary embodiment wherein the OGV exhaust gas is captured and transmitted to a purification placed on a lower deck on the OGV.

FIG. 6 shows a side view of an exemplary embodiment wherein purification unit 500 is placed on a lower deck of OGV 10 and is connected to exhaust pipe 50 via connector hood 100, ducting 110, two sets of duct hanger 130 and duct hanger outlet duct 132, and purification unit inlet 502. OGV 10 comprises hull 20, superstructure 30, guard railing 22, a stack/funnel 40. OGV 10 may be at-berth or at anchor. The placement on the deck may be temporary, in which case the purification unit may be placed by a crane or other lift device, or permanent or semi-permanent.

Figure 7:
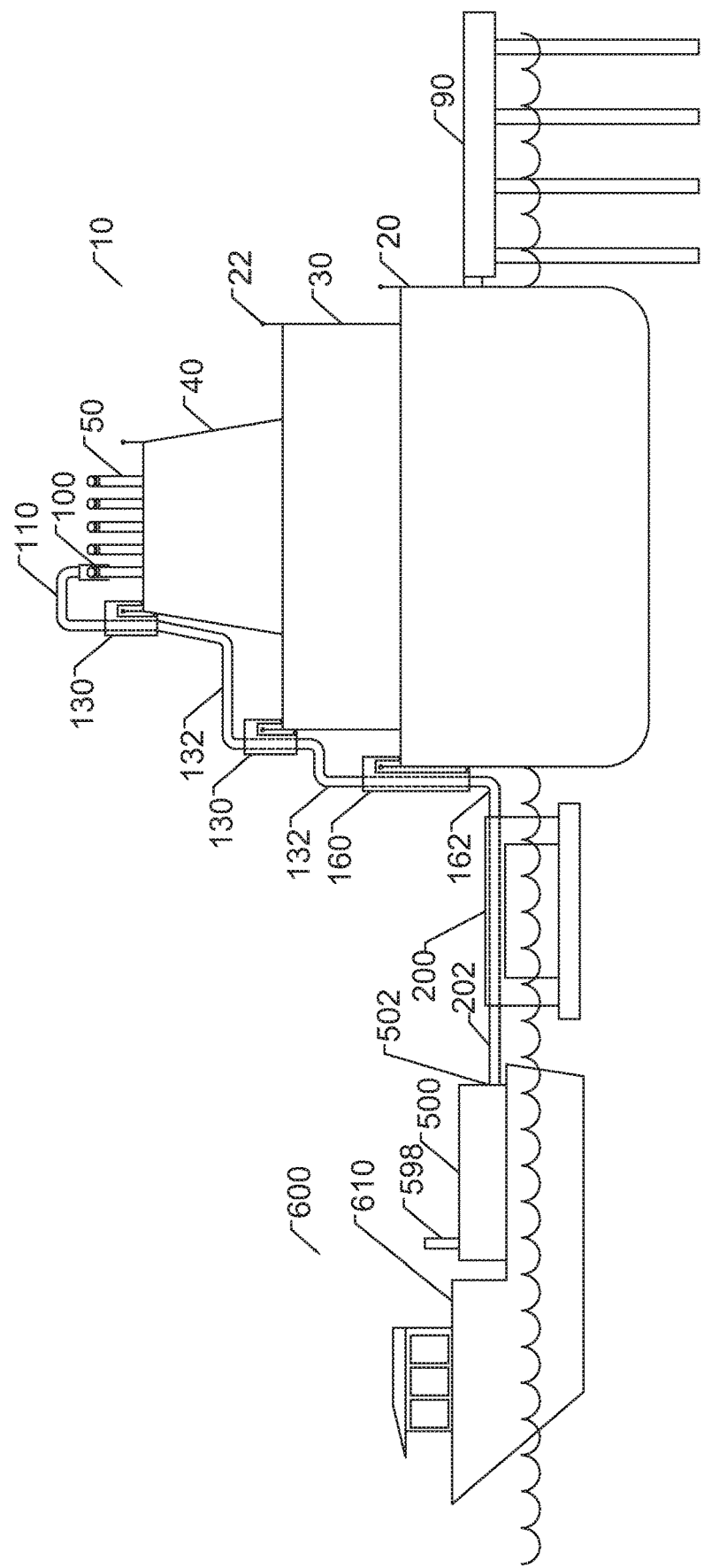
FIG. 7 shows a rear view of an exemplary embodiment wherein the OGV exhaust gas is captured and transmitted through cascading ductwork, through a floating duct section, and to a purification unit on a watercraft.

FIG. 7 shows a rear view of an exemplary embodiment wherein purification unit 500 is located on emissions control watercraft 600 (instead of a barge 302) in any location and orientation near OGV 10 and is connected to exhaust pipe 50 via connector hood 100, ducting 110, at least two sets of duct hanger 130 and duct hanger outlet duct 132, hull duct hanger 160 and hull duct hanger outlet duct 162, floating duct 200 and floating duct outlet duct 202, and purification unit inlet 502. OGV 10 comprises hull 20, superstructure 30, guard railing 22, a stack/funnel 40. OGV 10 is shown at-berth adjacent to wharf 90, although OGV 10 could located at-anchor.

Figure 8:
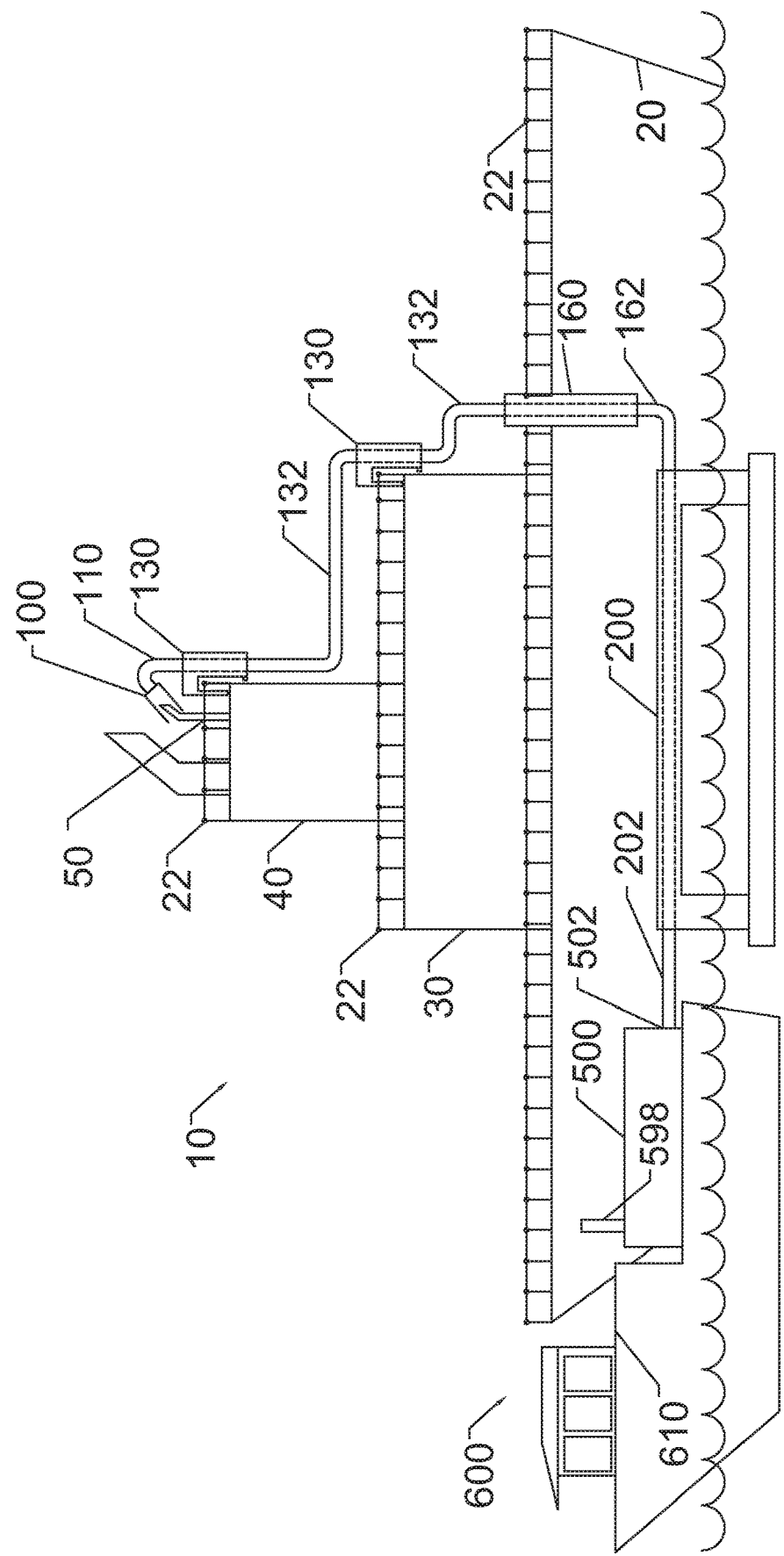
FIG. 8 shows a side view of an exemplary embodiment wherein the OGV exhaust gas is captured and transmitted through cascading ductwork, through a floating duct section, and to a purification unit on another watercraft.

FIG. 8 shows a side view of an exemplary embodiment wherein purification unit 500 is located on water-side deployment platform 610 on emissions control watercraft 600 in any location and orientation near OGV 10 and is connected to exhaust pipe 50 via connector hood 100, ducting 110, two sets of duct hanger 130 and duct hanger outlet duct 132, hull duct hanger 160 and hull duct hanger outlet duct 162, floating duct 200 and floating duct outlet duct 202, and purification unit inlet 502. OGV 10 comprises hull 20, superstructure 30, guard railing 22, a stack/funnel 40.

Figure 9:
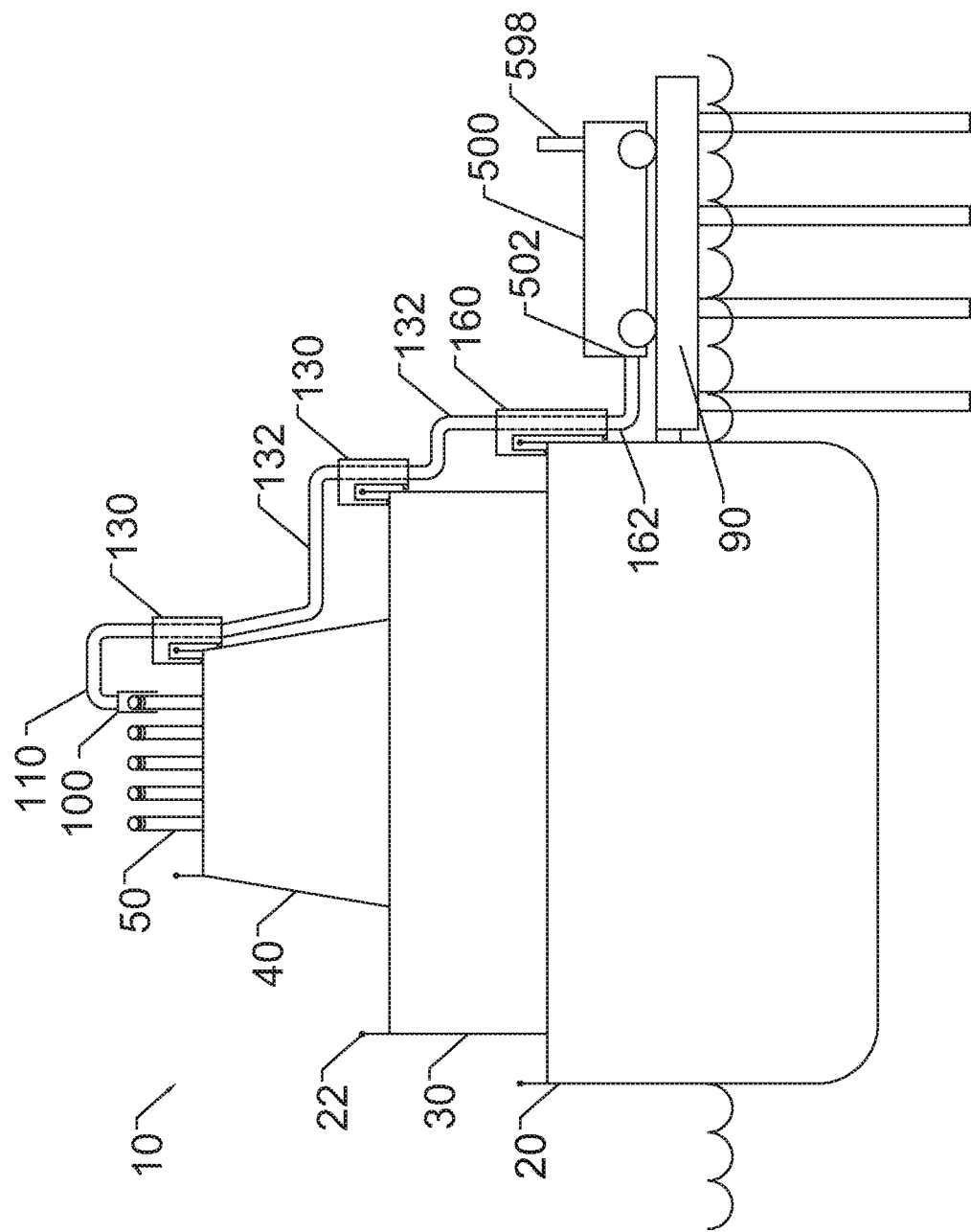
FIG. 9 shows a rear view of an exemplary embodiment wherein the OGV exhaust gas is captured and transmitted through cascading ductwork to a land-based purification unit.

FIG. 9 shows a rear view of an exemplary embodiment wherein land-based purification unit 500, which is shown mobile, but may be permanently located, and is located on wharf 90 and is connected to exhaust pipe 50 via connector hood 100, ducting 110, at least two sets of duct hanger 130 and duct hanger outlet duct 132, hull duct hanger 160 and hull duct hanger outlet duct 162, and purification unit inlet 502. OGV 10 comprises hull 20, superstructure 30, guard railing 22, a stack/funnel 40. OGV 10 is shown at-berth adjacent to wharf 90.

Figure 10:
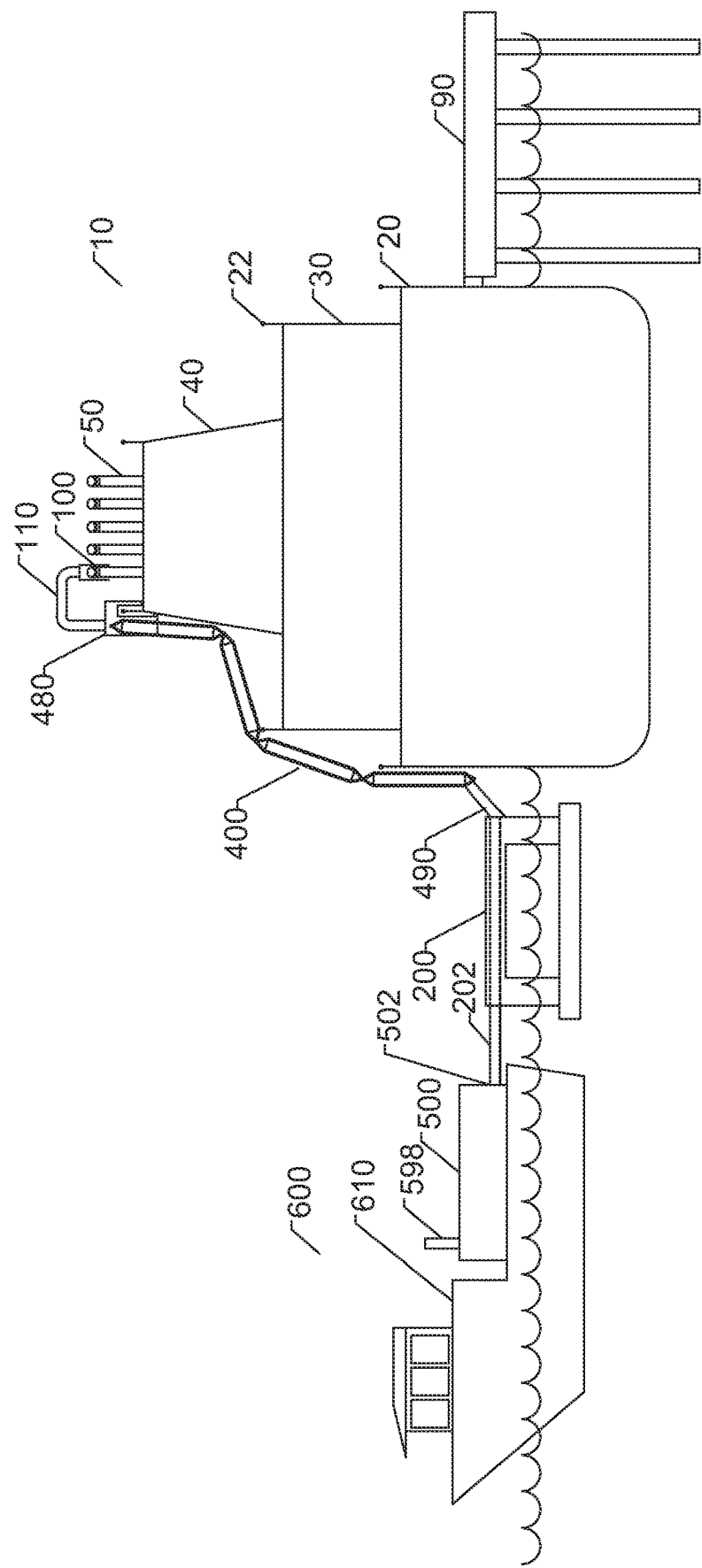
FIG. 10 shows an exemplary embodiment of a STAXLINK water-side approach wherein a purification unit is located on an emissions control watercraft near the serviced vessel (OGV) and is connected to the OGV exhaust pipe via a connector, ducting, and STAXLINK duct hanger secured on a railing of the OGV funnel/stack.

FIG. 10 shows an exemplary embodiment of a STAXLINK water-side approach wherein purification unit 500 is located on emissions control boat 600 near OGV 10 and is connected to exhaust pipe 50 via connector hood 100, ducting 110, STAXLINK duct hanger 480 is shown secured on a railing 22 of funnel/stack 40. A predetermined number of STAXLINKs 400 are connected in series to form a cascading lightweight ducting system from funnel/stack 40 to water level. The terminus of the final STAXLINK 400 connects to an optional floating duct 200 via interface duct 490. Exhaust gas thus flows through connector 100, duct 110, hanger 480, STAXLINKs 400, interface duct 490, floating duct 200, floating duct outlet duct 202, purification unit inlet 502, purification unit 500, and purification outlet 598. OGV 10 comprises hull 20, superstructure 30, guard railing 22 located on each deck, a stack/funnel 40. OGV 10 is shown at-berth adjacent to wharf 90 but could also just as well be located at-anchor. Note the absence of a crane/arm 310.

Figure 11:
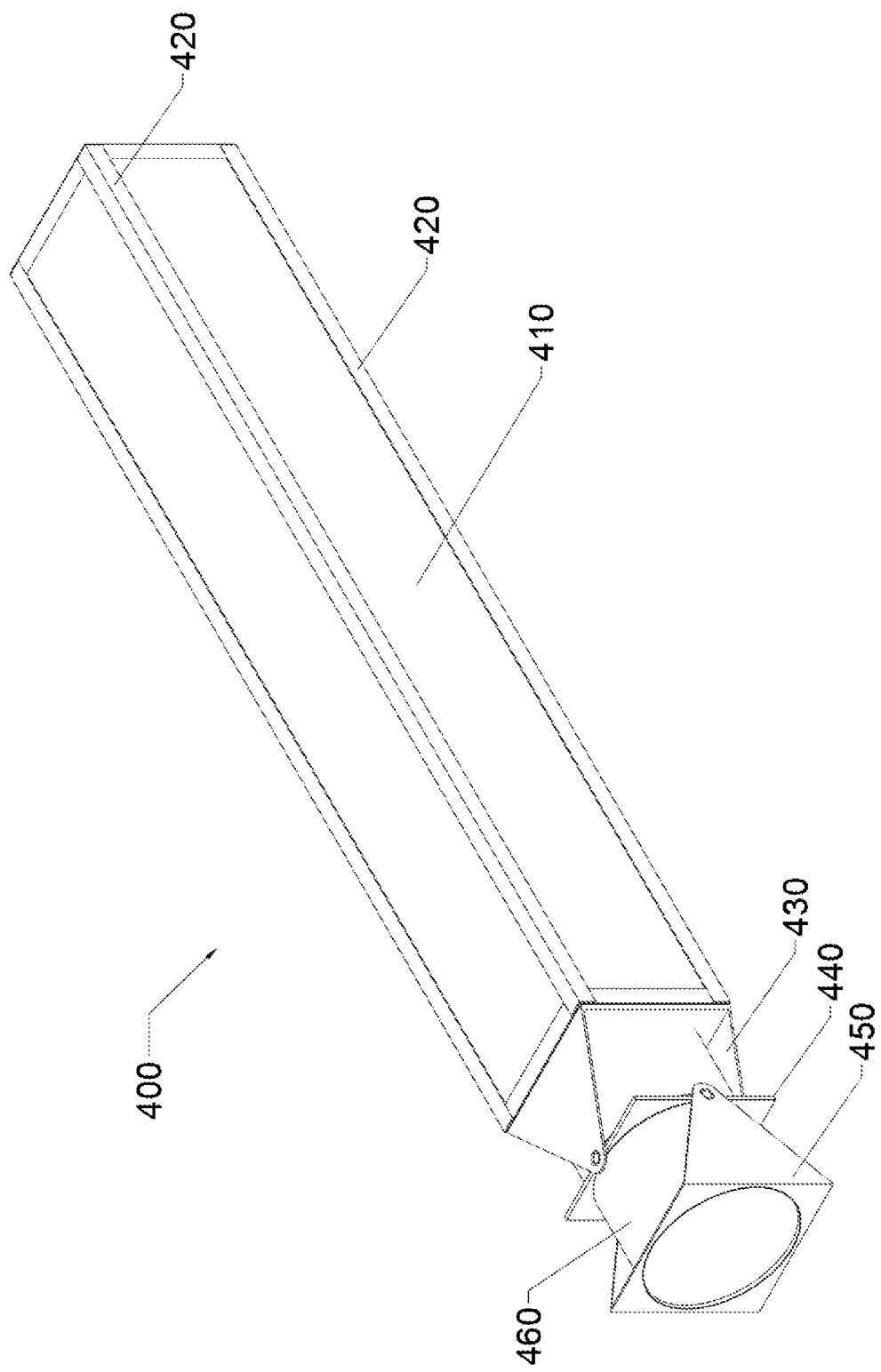
FIG. 11 shows a detail of a STAXLINK.

FIG. 11 shows an exemplary embodiment of STAXLINK 400 comprising four STAXLINK insulated panels 410 encased in STAXLINK frame 420, connected to STAXLINK Pivot A 430, STAXLINK Pivot Plate 440, STAXLINK Pivot B 450. The STAXLINK pivot assembly comprising pivot 430, pivot plate 440, and pivot 450 guides and support STAXLINK flexible conduit 460. The typical STAXLINK section preferably weighs less than 50 pounds, and no more than 5 pounds per lineal foot, so that a ten-foot section weighs no more than 50 pounds. Thus, each STAXLINK may be manipulated by a single person without needing an arm or crane 310.

Figure 12:
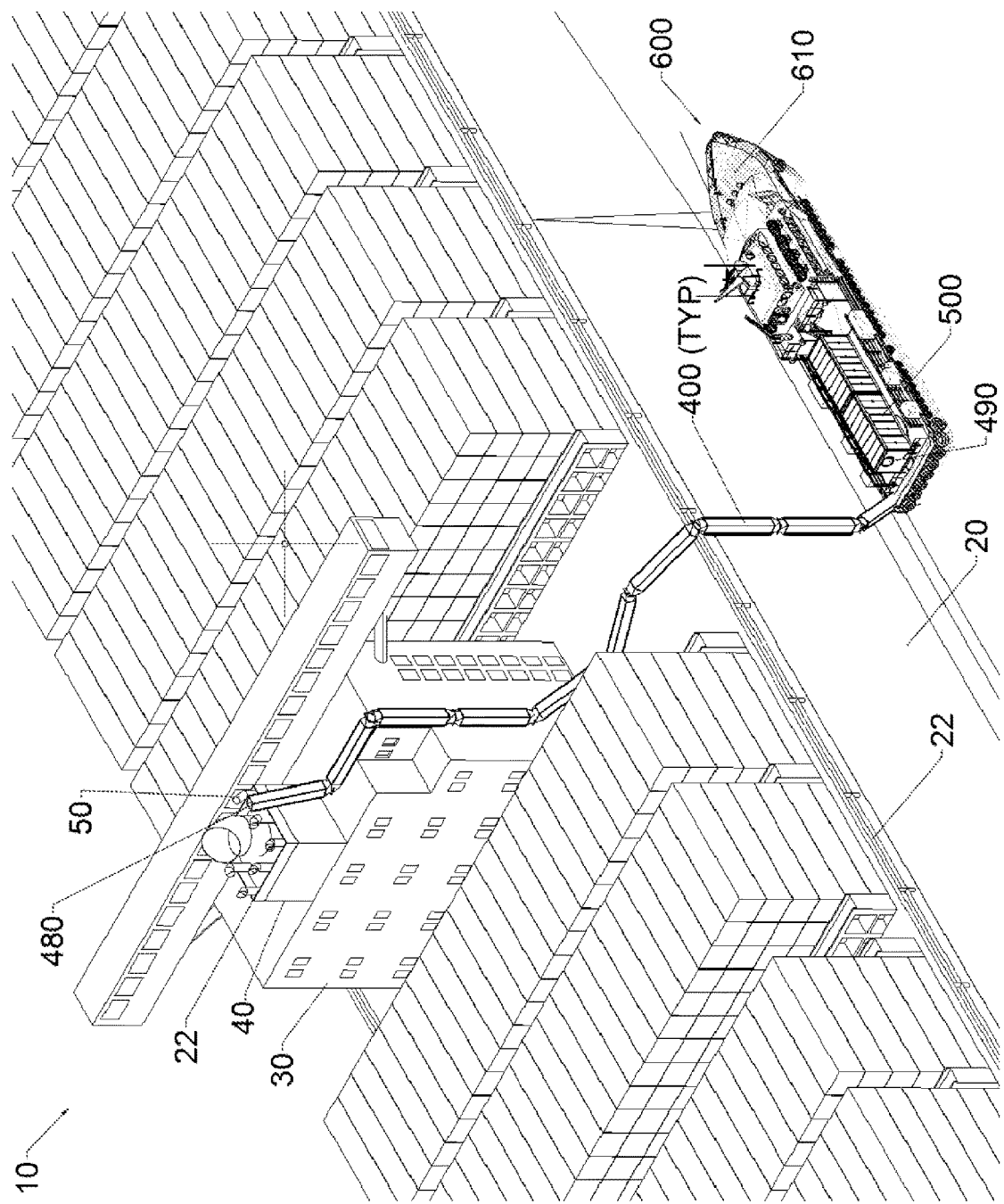
FIG. 12 shows a collection of STAXLINKs connected in series to convey exhaust gas from an OGV's stack to a purification unit on a boat.

FIG. 12 shows an exemplary embodiment of a STAXLINK water-side approach wherein purification unit 500 is located on emissions control boat 600 (instead of a barge 302) near OGV 10 and is connected to exhaust pipe 50, STAXLINK duct hanger 480 is shown secured on railing 22 of funnel/stack 40. A predetermined number of STAXLINKs 400, sufficient to reach from duct hanger 480 to water level are connected in series to form a cascading lightweight ducting system from funnel/stack 40 to water level. The terminus of the final STAXLINK connects to STAXLINK interface duct 490 which provides a flexible connection to purification unit 500. The OGV's exhaust gas then flows through purification unit 500, resulting in a purified gas. OGV 10 comprises hull 20, superstructure 30, guard railing 22, and a stack/funnel 40. OGV 10 may either be at-berth or at-anchor. Note the absence of a crane/arm 310.

REFERENCE NUMERALS

10 OGV (OGV) or Serviced Vessel
20 OGV Hull
22 OGV Railing
23 OGV Auxiliary Engine
24 OGV Auxiliary Boiler
30 OGV Superstructure
40 OGV Stack/Funnel
50 Exhaust Pipe
90 Wharf
100 Exhaust Pipe Connector Hood
110 Hood Duct
120 Interconnecting Duct
130 Duct Hanger
132 Duct Hanger Outlet Duct
150 Exhaust Gas
160 Hull Duct Hanger
162 Hull Duct Outlet
200 Floating Duct System
202 Float Duct System Outlet Duct
300 Barge-based Emissions Control System 302 Barge
310 Exhaust Capture Arm
320 Exhaust Capture Duct
330 Exhaust Intake Bonnet
350 Emissions Control Unit
352 Emissions Control Unit Inlet
358 Emissions Control Unit Outlet
400 STAXLINK
410 STAXLINK Insulated Panel
420 STAXLINK Exoskeleton
430 STAXLINK Pivot A
440 STAXLINK Pivot Plate
450 STAXLINK Pivot B
460 STAXLINK Flexible Conduit
480 STAXLINK Hanger
490 STAXLINK Interface Duct
500 Purification Unit
502 Purification Unit Inlet
598 Purification Unit Outlet
600 Emissions Control Boat
610 Watercraft Platform Operation In accordance with one exemplary embodiment, the system connector hood 100 will be placed on an exhaust pipe of the OGV. The ducting system will be assembled and connected to the connector hood and supported on the OGV by hangers or other support devices. The ducting system will be completed by assembly to either the floating duct section as outlined above or directly to the inlet of the purification unit 502.

An advantage of the systems illustrated in FIGS. 3-6 is that the ducting system connecting the connector hood 100 to the purification unit 500 is simplified, since the unit 500 may be much closer to the connector hood. A disadvantage is that a heavy lift capability may be needed if the unit is only temporarily mounted to the OGV deck. Some applications may mitigate the disadvantage by having the lift capability readily available, e.g., at the dock or terminal. For some vessels, a crane may be required to move cargo such as containers, and the crane may service a second function of placing and removing the unit 500.

Advantages of the systems shown in FIGS. 7-10 and 12 is that any requirement or need for a crane/arm or barge/crane/arm is eliminated.

The above description is intended to enable the person skilled in the art to practice the invention. It is not intended to detail all of the possible modifications and variations that will become apparent to the skilled worker upon reading the description. It is intended, however, that all such modifications and variations be included within the scope of the invention that is seen in the above description and otherwise defined by the following claims.

The invention claimed is:

1. A system for temporarily connecting to an exhaust pipe of an ocean-going vessel at berth or at anchor and reducing or removing impurities from exhaust gases emitted from the exhaust pipe, the system comprising:

a purification unit having an inlet port for receiving exhaust gases for purification and an outlet port for outputting gases in which impurities have been reduced or removed;

a plurality of duct sections cascaded together in series to form a cascading ducting system, wherein one or more of said plurality of duct sections comprises an exoskeleton, a plurality of insulated panels supported by the exoskeleton to form a duct internal volume, a pivot assembly and a flexible conduit section;

a connector for temporarily coupling to the exhaust pipe of the vessel to receive exhaust gases emitted from the exhaust pipe during purification processing, the connector having an outlet port connected to an inlet end of the ducting system;

one or more duct support structures, each configured to support at least one of the plurality of duct sections on a vessel structure;

an outlet end of the ducting system connected to either the inlet port of the purification unit or to an inlet port of a connecting duct system which is in turn connected to the inlet port of the purification unit;

wherein the system is free of use of a crane to support the ducting system during installation, purification operation and removal of the ducting system from the ocean-going vessel.

2. The system of claim 1, wherein said one or more of said plurality of duct sections comprising said exoskeleton and said plurality of insulated panels are portable duct sections, weighing no more than fifty pounds.

3. The system of claim 1, wherein each
pivot assembly comprises a pivot, a pivot plate and pivot guides.

4. The system of claim 1, wherein the vessel structure includes a vessel railing, and the duct support structure includes a duct hanger configured to attach to the vessel railing.

5. The system of claim 1, wherein the vessel structure includes a vessel deck, and the purification unit is placed on the vessel deck.

6. The system of claim 5, wherein the vessel deck is an upper deck, and the purification unit is placed on the upper deck.

7. The system of claim 5, wherein the vessel deck is a lower deck, and the purification unit is placed on the lower deck.

8. The system of claim 1, wherein the purification unit is mounted on a boat having a hull, and not a barge.

9. The system of claim 8, wherein the outlet end of the ducting system is connected to an inlet port of a connecting duct system which is in turn the inlet port of the purification unit, the connecting duct system including a floating duct section.

10. The system of claim 1, wherein the purification unit is mounted on a land-based platform.

11. The system of claim 10, wherein said land-based platform is a mobile platform.

12. The system of claim 10, wherein said land-based platform is permanently located on a wharf.

13. The system of claim 1, wherein the purification unit is temporarily emplaced on a deck of the vessel.

14. A duct system configured to convey exhaust gas from an exhaust pipe of an emissions source to a purification unit during an emissions reduction operation, wherein the duct system is configured for temporary installation onto the emissions source without a crane; and for support by the emissions source itself for the duration of the emissions reduction operation;

wherein the duct system comprises a plurality of duct sections cascaded together in series to form a cascading ducting system, and wherein one or more of said plurality of duct sections comprises an exoskeleton, a plurality of insulated panels supported by the exoskeleton to form a duct internal volume, a pivot assembly and a flexible conduit section;

the duct system including a connector for temporarily coupling to the exhaust pipe of the emissions source to receive exhaust gases emitted from the exhaust pipe during the emissions reduction operation, the connector having an outlet port connected to an inlet end of the duct system.

15. The duct system of claim 14, wherein the emissions source is one of an oceangoing vessel and a building structure.

16. The duct system of claim 14, wherein the duct sections are portable duct sections, weighing no more than fifty pounds.

17. The system of claim 14, wherein each
pivot assembly comprises a pivot, a pivot plate and pivot guides.

18. A method for temporarily connecting to an exhaust pipe of an ocean-going vessel at berth or at anchor and reducing or removing impurities from exhaust gases emitted from the exhaust pipe, the method comprising a sequence of the following steps:
providing a purification unit having an inlet port for receiving exhaust gases for purification and an outlet port for outputting gases in which impurities have been reduced or removed;
connecting together a plurality of lightweight duct sections in series to form a cascading ducting system, and wherein one or more of said plurality of duct sections comprises an exoskeleton, a plurality of insulated panels supported by the exoskeleton to form a duct internal volume, a pivot assembly and a flexible conduit section;
temporarily coupling a connector to the exhaust pipe of the vessel to receive exhaust gases emitted from the exhaust pipe during purification processing;
connecting an outlet port connected to an inlet end of the ducting system;
supporting one or more of the duct sections of the cascading duct system on a vessel structure;
connecting an outlet end of the ducting system to either the inlet port of the purification unit or to an inlet port of a connecting duct system which is in turn connected to the inlet port of the purification unit;
operating the purification unit to reduce or remove impurities from the exhaust gas;
wherein the method is free of use of a crane to support the ducting system during installation, purification operation and removal of the ducting system from the ocean-going vessel.

* * * * *